United States Patent [19]

Ash et al.

[11] Patent Number: 5,670,586
[45] Date of Patent: Sep. 23, 1997

[54] POLYKETONES WITH ENHANCED TRIBOLOGICAL PROPERTIES

[75] Inventors: Carl Edwin Ash, Sugar Land; Narayana Mysore, Houston, both of Tex.

[73] Assignee: Shell Oil Company, Houston, Tex.

[21] Appl. No.: 570,019

[22] Filed: Dec. 11, 1995

[51] Int. Cl.⁶ ............... C08J 3/28; C08J 3/24; C08G 67/02

[52] U.S. Cl. ............ 525/539; 528/392; 522/162

[58] Field of Search ............... 522/162, 169; 525/539; 528/392

[56] References Cited

U.S. PATENT DOCUMENTS

| | | | |
|---|---|---|---|
| 3,414,498 | 12/1968 | Shinohara et al. | |
| 3,530,109 | 9/1970 | Fenton | 528/392 |
| 3,563,869 | 2/1971 | Rainer et al. | |
| 3,773,870 | 11/1973 | Spillers et al. | |
| 3,812,025 | 5/1974 | Guillet et al. | |
| 3,852,177 | 12/1974 | Atchison et al. | |
| 4,525,257 | 6/1985 | Kurtz et al. | 525/222 |
| 4,668,577 | 5/1987 | Ohta et al. | 428/364 |
| 4,853,420 | 8/1989 | Pham | 521/53 |
| 4,880,904 | 11/1989 | Kinneberg | 528/392 |
| 5,037,944 | 8/1991 | Smaardijk | 528/229 |
| 5,079,340 | 1/1992 | Auerbach | 528/392 |
| 5,089,321 | 2/1992 | Chum et al. | 428/218 |
| 5,104,921 | 4/1992 | Erickson et al. | 524/274 |

FOREIGN PATENT DOCUMENTS

61275333A   12/1986   Japan.

OTHER PUBLICATIONS

Xu, "Photodegradation of Olefin/CO Alternating Copolymer", Macromolecules vol. 26 #14; 1993.

*Primary Examiner*—David Buttner
*Attorney, Agent, or Firm*—Todd F. Volyn

[57] ABSTRACT

Polyketone polymers are cured by exposure to high energy radiation. Radiation sources include gamma radiation sources such as $Co^{60}$ emitters as well as e-beam, ion and other commercially used sources of high energy radiation. The materials so produced are high molecular weight crosslinked polyketone polymers which exhibit enhanced mechanical and tribological properties.

28 Claims, No Drawings

POLYKETONES WITH ENHANCED TRIBOLOGICAL PROPERTIES

FIELD OF THE INVENTION

This invention relates to polyketone polymers. More particularly, this invention relates to crosslinked polyketone polymers and their production.

BACKGROUND OF THE INVENTION

Polymers of carbon monoxide and olefins generally referred to as polyketones are well known in the art. The class of linear alternating polymers of carbon monoxide and at least one ethylenically unsaturated hydrocarbon are of particular interest among polyketone polymers. This class of polymers is disclosed in numerous U.S. patents assigned to Shell Oil Company, exemplified by U.S. Pat. Nos. 4,880,865 and 4,818,811 which are incorporated herein by reference.

Polyketone polymers display a well balanced set of mechanical properties which make them particularly useful as engineering thermoplastics. The excellent properties of polyketones could be further exploited by further improving the materials so that they exhibit improved tribological properties. Such parts and items made from such materials would be able to resist wear and bear greater frictional loads when in rolling or sliding contact. This would be particularly desirable over extended durations. Such properties are generally attained through the addition of new or additional additives. It would be beneficial if they could be attained without the addition of additives to avoid other changes in mechanical properties due to additive loading of the polymer matrix. It would also be beneficial if other attributes such as thermal performance, dimensional stability, and tensile strength could be improved without further loading the polymer with additives.

It is known that polymers containing ketone groups degrade according to Norrish type I and/or Norrish type II scission reactions upon exposure to UV radiation. This occurs either in the presence or absence of oxygen. We have found that alternating polyketones UV irradiated in the presence of oxygen undergo significant molecular weight loss resulting in a polymer having undesirable properties such as brittle behavior and loss of mechanical strength. When the irradiation occurs in the absence of oxygen, similar scission reactions occur initially, however, a crosslinked polymer is formed which also suffers from embrittlement and loss of mechanical strength. The latter crosslinked materials have significant gel fractions (greater than about 10%).

It is also known that linear alternating polyketones can undergo crosslinking in the melt through ionic reactions such as aldol condensations and the like if the polymer has a significant heat history. These crosslinked materials suffer from a loss in ductility and toughness and often possess discrete gel particles in the polymer matrix. Polyketones which undergo this type and degree of crosslinking (in the melt) also exhibit reduced crystallinity and/or crystalline melting point. Furthermore, such materials are destabilized toward oxidative degradation. In short, polyketones which are crosslinked in the melt are not particularly desirable. Aside from chemical modification/reaction, substantially crosslinked alternating aliphatic polyketones which do not exhibit such a loss in mechanical properties have not been heretofore produced.

The exposure of polymeric materials to high energy electromagnetic radiation can also affect both the physical and chemical properties of the material. One way in which polymers can be affected is through crosslinking. Crosslinking is the attachment of at least two chains of polymer molecules. It can be accomplished through the use of a bridge which bonds to at least one atom along each polymer chain. Alternatively, crosslinking can occur through branching along the polymer backbone. When crosslinking is extensive a network may be formed which is insoluble in typical solvents used in the uncrosslinked polymer.

Curing, as the term is used generally, refers to the treatment of a starting product to produce a finished product which is more useful for a particular purpose. Polyethylene, for example, can be cured to form various useful crosslinked versions of the polymer through γ-irradiation. With respect to polyketones, it has been hoped that the following useful properties could be improved through a curing process: wear properties, thermal properties (e.g. heat deflection temperature and melt viscosity), barrier properties, chemical resistance properties, creep and fatigue properties. Retention of ductility, tensile strength, and impact strength are also important during cure.

In some applications, exposure to electromagnetic radiation is affected for a purpose other than crosslinking or curing. For example, sterilization against biological contamination is often conducted through the bombardment of vessels with γ-radiation. Property improvement is not necessarily an objective of such decontamination but it is important that the materials not significantly lose mechanical properties such as ductility, tensile, and impact strength.

U.S. Pat. No. 3,812,025 to Guillet proposes radiation crosslinking of polyolefins having a small mole fraction of carbon monoxide as monomer (generally between about 1 and 10 mole %). While Guillet also presents the possibility of crosslinking polyolefins with up to 50 mole % ketone groups, such crosslinking was expected to be accompanied by Norrish I/II chain scission reactions. Guillet's article in the Journal of Polymer Science describing this same work presented in this patent explains why this is so. There he states that the photolysis attributable to Norrish type I and Norrish type II reactions increases with decreasing aliphatic/ketone lengths (greater mole fraction of carbon monoxide). J. A. Slivinskas and J. E. Guillet, γ-Radiolysis of Ketone Polymers, Journal of Polymer Science, Vol. II, 3043–3056 (1973). This view would be in accordance with the understanding of the degradative processes set forth above. Thus, Guillet's work suggests that irradiated alternating polyketones should undergo simultaneous scission and crosslinking resulting in a crosslinked material which would not retain ductility, impact, and tensile strength. Any crosslinked material so formed would be expected to be comprised of relatively low molecular weight fragments between crosslinks. Thus, it can be seen why Guillet restricted radiation crosslinking to polymers having a large aliphatic chain length to ketone portion of the backbone. The examples and claims of the patent are drawn to materials having a maximum of about 5 mole % carbon monoxide.

Thus, the prior art would suggest that any improved effect that could be hoped to be attained by radiation curing would have been offset by the more likely outcome that polyketone polymer would undergo degradation. It has now been found that the properties of polyketone polymers can be enhanced through high energy curing without such degradation and that the materials produced from this process are unique.

SUMMARY OF THE INVENTION

This invention provides a method of making polyketones with enhanced tribological properties and articles produced by practicing this method. In this method, polyketone polymer articles are exposed to high energy radiation in the substantial absence of oxygen. Cured polyketone polymer articles produced by this method exhibit enhanced thermal and tribological properties and are useful in applications where such articles are placed in rolling or sliding contact with another article.

DETAILED DESCRIPTION OF THE INVENTION

The following terms when used in this specification shall have the following meanings:

"Polyketones" are alternating polymers of carbon monoxide and at least one ethylenically unsaturated hydrocarbon. The term "polyketone" also refers to copolymers and terpolymers thereof. Other polymer additives well known in the art can also be used in conjunction with polyketones thus prepared. For instance, fillers, extenders, lubricants, pigments, plasticizers, and other polymeric materials can be added to the polyketone compositions being stabilized to improve or otherwise alter the properties of the compositions.

"DCOF": During relative motion of two surfaces in contact the DCOF is the ratio of the resulting frictional force to the applied normal force while holding the relative surface velocity constant over time.

"LPV": While holding the relative surface velocity constant between two specimens in contact and increasing the applied normal force in a stepwise manner in time, the LPV is the multiplicative product of the normal pressure and surface velocity at the step just prior to catastrophic material failure due to thermal softening.

"Wear K Factor": As performed on a thrust washer test apparatus using ASTM D3702 and defined as:

$$K(\text{wear factor}) = \frac{W}{FVT}$$

Where:
W=volume wear (in$^3$)
F=normal force (lb)
V=relative surface velocity (ft/min)
T=testing time (hr)

"Crosslinking" is the attachment of two or more polymer molecules at least one point on the backbone of each polymer molecule so joined. Crosslinking results in an increase in molecular weight. Extensive crosslinking results in the formation of an intractable network. A substantially crosslinked polyketone, as used throughout this specification is a polyketone polymer which exhibits an increase in the weight average molecular weight of at least about ten percent (10%) relative to the polyketone staring material. Indeed, polyketone polymer which is already crosslinked to one degree or another can be further crosslinked according to the method of this invention. When it displays an increase in at least about ten percent of the weight average molecular weight it will have been substantially crosslinked according to the terms of this specification.

"Curing" is the crosslinking of polyketone polymer without an overall loss in useful mechanical properties. Cured polyketone polymers are distinguished from other crosslinked polyketone polymers (e.g. those crosslinked in the melt) in their exhibition of less than a ten percent increase (relative to the uncured material from which it was made) in the intensity of emission at 490 nm when excited with 400 nm light.

"Specific surface area" means the surface area per unit mass (m$^2$/gm). It is also a relative measure of the amount of the volume of a given material which is presented as surface area.

Polyketone polymer and a source of high energy radiation are needed to practice this invention. Broadly speaking, the compositions of this invention are made by exposing polyketone polymer to high energy radiation under conditions in which the exposure of the polymer to oxygen is minimized. Articles of manufacture according to this invention are molded polyketone articles which have been cured using high energy radiation. These articles display enhanced tribological properties and other improved mechanical properties. The process of this invention comprises irradiating polyketone polymer at one or more points during the processing of polymer or articles made therefrom.

The polyketone polymers which are employed as the major component of the polymer composition of the invention are of a linear alternating aliphatic structure and contain substantially one molecule of carbon monoxide for each molecule of ethylenically unsaturated hydrocarbon. By aliphatic it is meant that the polymer backbone itself is aliphatic. It is possible to incorporate or append aromatic groups to the backbone and yet the polymer itself would be considered aliphatic since the polymer backbone itself would be comprised of substantially no aromatic groups as one would find in, for example, a PEEK polymer. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

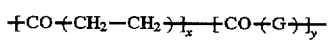

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(CH$_2$—H$_2$—)units and the —CO—(G—)units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

The polyketone polymers of number average molecular weight from about 1000 to about 200,000, particularly those of number average molecular weight from about 20,000 to about 90,000 as determined by gel permeation chromatography are of particular interest. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

Preferred methods for the production of the polyketone polymers are illustrated by U.S. Pat. Nos. 4,808,699 and 4,868,282 to van Broekhoven, et al which issued on Feb. 28, 1989 and Sep. 19, 1989 respectively and are herein incorporated by reference. U.S. Pat. No. 4,808,699 teaches the production of linear alternating polymers by contacting ethylene and carbon monoxide in the presence of a catalyst comprising a Group VIII metal compound, an anion of a nonhydrohalogenic acid with a pKa less than 6 and a bidentate phosphorous, arsenic or antimony ligand. U.S. Pat. No. 4,868,282 teaches the production of linear random terpolymers by contacting carbon monoxide and ethylene in the presence of one or more hydrocarbons having an olefinically unsaturated group with a similar catalyst.

As noted above, the compositions of this invention are polyketone polymers as described above which have been cured by exposure to high energy radiation. These polyketone polymers may be cured at any stage of their production. This can include bombardment with high energy radiation during or after the melt fabrication of polyketone polymer. Thus, parts or other useful items may be fabricated from linear alternating polyketones and then irradiated with high energy radiation to affect cure.

Degree or depth of cure is dependent, in part, on the source and intensity of the radiative source. When the material is cured by a photon-type source of radiation such as γ-radiation, the cure can be affected throughout the polymer matrix. This is largely due to the penetrating nature of the radiation. Surface curing will occur with nonpenetrating radiation such as an ion beam. Here, the type of ion used and the intensity of the bombardment will dictate the depth and degree of cure. Lighter ions will, of course, create a greater depth of cure than will heavier ions.

Electron beam crosslinking is particularly attractive as an industrial application. Polymer wires and cables, pellets, heatshrink products, rotomolded parts, blow-molded containers, injected molded parts, and sheets are all easily subjected to high energy bombardment in such off-line processes with a minimum impact on other parts of the manufacturing process. The process can be nearly instantaneous with exposure times measured in seconds. One skilled in the art will readily appreciate that the degree of crosslinking is directly related to the level of e-beam exposure and can be readily controlled.

Cured polyketone compositions of this invention substantially retain or improve their mechanical properties while increasing their molecular weight through crosslinking. Cured polyketones made according to this invention generally display weight average molecular weights (Mw) that are 10% or more greater than in the uncured polyketones from which they are produced. In the most preferred embodiment of this invention, the polyketone is irradiated with 5 Mrads of gamma radiation from a $Co^{60}$ source resulting in a crosslinked polyketone polymer having a Mw that is at least 100% greater than in the uncured polyketone from which it is made.

It has been found that tribological properties such as LPV and Wear Factors have been improved through the practice of this invention. In the most preferred embodiment of this invention, the cured polyketone polymer displays an LPV which exceeds the measurement capacity of commercially available analyzers such as the Falex brand analyzer. That is, the LPV is greater than 200,000 psi. Cured polyketone gears, bearings, and other parts which are in rolling or sliding contact can thus bear greater loads than parts which are not so cured.

High temperature properties of the materials made according to this invention are also improved over those of the prior art. For example, the heat deflection temperature (HDT) of polyketone cured by exposure to 20 Mrads of gamma radiation is about 100° C. whereas uncured polyketone polymers generally display HDTs of about 92° C.

It is also believed that long term mechanical properties such as, dimensional stability (e.g. creep), tensile strength and resistance to fatigue are also improved through the practice of this invention as are other properties such as barrier properties, elastic memory, stress crack resistance, resistance to plasticization, puncture/tear resistance, and melt processability of the polymer. For example, cured polyketones made according to this invention should exhibit a lower transmission of reagents through the polymer matrix and should resist swelling or sorption of water, alcohol, chlorinated hydrocarbons and the like relative to uncured polyketones.

The cured polyketones of this invention can be used to produce snap fit parts, parts for use in load bearing applications, and heat shrinkable molded parts. It should also be useful in the preparation of parts useful in down-hole applications such as chemical, wear, and heat resistant piping. Sleeves, wire and cable jacketing, coatings, connectors, liners, tubes and the like can also be made to good effect from this material. Such parts would have particular utility in the electrical, automotive, aerospace, and medical industries. Extrusion grade polymers and films can also be made from cured polyketones prepared according to this invention.

The useful crosslinked polyketones produced according to this invention can be readily distinguished from the melt crosslinked materials by characterization according to both visible fluorescence observations and florescence spectroscopy (excitation/emission spectra). Melt crosslinked polyketones display visible florescence under mercury vapor illumination while polyketones crosslinked by exposure to high energy radiation do not. Further, excitation and emission spectra for melt crosslinked polyketone is vastly different from polyketone polymer crosslinked by high energy radiation as is set forth in the examples. Such characteristic differences can only result from differences in chemical structure. Melt crosslinked polyketone polymers have a chemical structure having a flourophore species while irradiation cured polyketone polymers do not as is typical of the polyketone polymer starting material from which it was produced.

The process of this invention is practiced by exposing linear alternating polyketones to a source of high energy radiation at a dose and for a time sufficient to cause the polyketone to undergo crosslinking. When the crosslinking results in a growth of molecular weight and retention or improvement of one or more of the properties set forth above the process of this invention has been applied. High energy radiation useful to bring about the cure of this invention is any irradiation which occurs with energy greater than about 10 eV and can be successfully undertaken with irradiation which occurs with energy up to about $10^9$ eV. Well known sources of such radiation include e-beam, x-ray, gamma ray, and ion beams. Preferred sources are e-beam, gamma radiation, and, when surface curing is desired, ion beam. The most preferred source is a gamma radiation source such as industrial Co[60] emitters. However, it is believed that any radiation source may be used provided that it produces high energy radiation.

When gamma radiation is used as the source of irradiation preferred doses range between about 5 MRads and about 25 MRads although doses between about 1 and 50 MRads are believed to have a beneficial effect. It is most preferred that the dose be about 5.6 MRad. The preferred rate of irradiation is about 0.28 MRad/hour. Any rate necessary to apply the doses needed for cure may be applied but cure is believed to be most efficiently affected with the highest rate of irradiation possible for the given emitter. The dose and rate of irradiation can be significantly lowered with the additional use of radiation accelerators known in the art such as triallyl cyanurates, ethylene glycol dimethacrylate, polyethylene glycol dimethacrylate, and allyl methacrylate. Polyketone may be cured with or without the presence of other additives such as antioxidants and melt stabilizers. No special preparation of the polyketones is necessary.

It is necessary to restrict the susceptibility of the polymer to the influence of oxygen to properly affect cure. Conducting the irradiation in the substantial presence of oxygen results in chain scission and thus low molecular weight materials are produced. By substantial presence of oxygen, it is meant that a significant portion of the total volume of the polymer is exposed to oxygen. Thus, there is a threshold quantity of polymer volume which must be in the substantial absence of oxygen to crosslink without significant chain scission and thereby properly affect cure. The specific surface area is a measure of the degree of such exposure when the polymer is irradiated in air. The greater the specific surface area, the greater will be the propensity for chain scission. It is currently known that polyketones having specific surface areas of less than about $2.1 \times 10^{-3}$ m$^2$/gm will undergo crosslinking while those having specific surface areas of at least about 0.10 m$^2$/gm will undergo chain scission in the presence of air. It is believed that polyketones having specific surface areas of as little as $1 \times 10^{-3}$ m$^2$/gm will crosslink in the presence of air. Thus, cryoground polymer is ordinarily unsuitable for irradiation crosslinking in the presence of air due to the high proportion of polymer volume which would be exposed to oxygen. However, strands, most finished articles of manufacture such as gears and bearings, stock shapes for further machining, sheet, and the like are ordinarily well suited for irradiation curing.

Conducting the process of this invention in a vacuum or while blanketing the material or fabricated part with an inert gas such as nitrogen or a noble gas can also be used to properly attain curing of the polyketone. Such a procedure ensures that the threshold quantity of polymer volume which must be in the substantial absence of oxygen is so irradiated in the substantial absence of oxygen.

The temperature at which this process is carried out does not appear to be important. However, it is preferred that it be conducted at temperatures below the melting point of the polyketone polymer. Curing through the crosslinking of finished parts is one such preferred process. Nevertheless, curing can still be conducted above the melting point to produce various useful embodiments of the cured material.

The invention is further illustrated through the following nonlimiting examples.

EXAMPLES

In each of the examples, properties were determined as follows.

Mechanical Properties:

ASTM D638, 1/8" thick Type I and Type V tensile bars were run at strain rates of 2 inch per minute for type I bars with a 4.5 inch grip to grip distance. Strain rates of 0.5 inch per minute and grip to grip distance of 1.0 inch were used for Type V bars.

Molecular Weight:

A GPC system equipped with a Phenomenex Phenogel 7.8 mm×30 cm, 5 micron linear and Phenogel 5 micron, 500 A columns connected in series was used to determine molecular weight. Hexafluoroisopropanol was used as the solvent with 0.01M ammonium trifluouroacetate as modifier. The system is equipped with a Waters 410 refractive index detector and a Wyatt's mini-DAWN light scattering detector.

Tribological Properties:

A Computer Controlled Multi-Specimen Test Machine manufactured by Falex Corporation was employed. In this testing, a thrustwasher injection molded from the material to be tested was spun against a steel stationary washer in one direction. Data logging for the following parameters was conducted continuously: speed, load, temperature, wear, and run time. LPVs, DCOF, and Wear Factors were computed from this data logging.

LPV was measured at 100 fpm velocity with stepped 10 lb. load increments from 20 lbs. to specimen failure. Specimen failure is the sudden loss of structural integrity at melt softening. Wear tests were run at 350 psi load and 56 fpm velocity for 4 hours to seat test specimens which were not irradiated. Specimens which were then irradiated (after seating) were run at 40 psi and 50 fpm for 20 hours on a new stationary washer (a 1018 carbon steel with a 16–18 rms finish). The test specimen and stationary washer were measured for thickness and weight before and after each run. The specific gravity of the test specimen was then incorporated into the computation of the resulting wear factor.

Other:

Heat Deflection Temperatures (HDT) were determined using ASTM D648 (with a 264 psi load). Melting point (Tm) and enthalpy of fusion (ΔH) were determined using a differential scanning calorimeter (Perkin Elmer model 7700) under nitrogen with a ramp rate of 20° C. per minute.

Unless otherwise stated, irradiation of the materials used in the examples was accomplished by subjecting the polyketone polymer with a Co[60] γ-radiation source at a rate of 0.28 Mrad/hour.

Example 1

Neat linear polyketone (terpolymer of carbon monoxide, ethylene, and a minor amount of propylene) having a melting point of about 220° C. and a limiting viscosity number of about 1.8 dL/g was prepared. This material was blended with 0.2% IRGANOX 1330 brand hindered phenol antioxidant commercially available from Ciba-Geigy Corp., 0.3% NUCREL 535 brand ethylene methacrylic acid copolymer commercially available from DuPont De Nemours & Co. Inc., 0.2% calcium hydroxyapatite (all percentages are as a weight percent of total weight of the mixture). Tensile bar specimens were prepared from this material. Specimen A was not subsequently irradiated. Specimens B and C were γ-irradiated in air with 5.6 Mrads and 20 Mrads, respectively. Various mechanical properties and characteristics were measured as set forth in Table 1 below.

TABLE 1

Unless specifically stated tensile strengths are at yield and elongations are yield.

| Tensile Bar | Molecular Weight (Mw) | ΔH Joules/ Grams | Yield Strain, (%) | Yield Stress, (psi) | Break Strain, (%) | Break Stress, (psi) | Notched Izod (ft-lb) | HDT (C) | Tm (C) |
|---|---|---|---|---|---|---|---|---|---|
| A | 69,400 | 70 | 23 | 8853 | 308 | 14,677 | 4.9 | 92 | 224 |
| B | 150,000 | 70 | 24 | 8974 | 311 | 14,916 | 4.5 | Not Tested | 222 |
| C | 70% GEL | Not Tested | 25 | 9364 | 265 | 13,824 | 3.9 | 100 | Not Measured |

This examples shows that γ-irradiation of polyketone polymer results in molecular weight increase and that such increase is related to the dosage of radiation (network formation occurred at 20 Mrads). Further, the cured polyketone according to this invention maintain or improve the excellent tensile strength and ductile properties of the polymer. High temperature properties are also improved. Crystallinity of the polymer is not affected by the cure process.

The specimens which were irradiated in this example had a sufficiently low specific surface area such that most of the volume of the polymer was not in the substantial presence of oxygen during the cure. This resulted in crosslinking without a preponderance of scission or other competing deteriorative processes.

Example 2

Neat linear polyketone (terpolymer of carbon monoxide, ethylene, and a minor amount of propylene) having a melting point of about 220° C. and a limiting viscosity number of about 1.8 dL/g was prepared (Mw of 83,000 with a MWD of 4.3). This material was blended with 0.5% IRGANOX 1330 brand hindered phenol antioxidant commercially available from Ciba-Geigy Corp in a 15 ml Baker Perkins twin screw extruder and forced through a die to yield a 60 mil (diameter) strand. Approximately 10 grams of the polymer strand was placed in a glass tube in the presence of air. The sample thus presented a specific surface area of about $2.1 \times 10^{-3}$ m$^2$/gm. No evacuation or blanketing of the atmosphere was conducted. The sample was then exposed to 5.6 Mrads of γ-radiation. The weight average molecular weight (Mw) of the polymer was then analyzed and found to be 160,000 with a molecular weight distribution (MWD) of 11.3. This increase in Mw indicates that curing has occurred.

This example illustrates that polyketone polymer whose volume is not substantially exposed to oxygen can be cured through exposure to high energy radiation even in the absence of an inert atmosphere or vacuum.

Example 3 (Comparative)

The polyketone polymer of Example 2 was cryoground into a powder. About 10 grams of the polymer powder was placed in a glass tube in the presence of air. The samples thus presented a specific surface area of about 0.10 m$^2$/gm (as measured by the BET method). No evacuation or blanketing with an inert atmosphere was conducted. The sample was then exposed to 5.6 Mrads of γ-radiation. The molecular weight (Mw) of the polymer was then analyzed and found to be 41,000 with an MWD of 3.5 indicating that chain scission had occurred rather than crosslinking.

This example illustrates that polyketone polymer having a large proportion of its volume exposed to oxygen while being exposed to high energy radiation degrades resulting in a product which is not cured.

Example 4

Example 3 was repeated except that the vessel containing the polymer powder was evacuated with a residual pressure of 3 millitorr. After irradiation with 5.6 Mrads, the Mw of the material was 170,000 with an MWD of 8.1 indicating that significant crosslinking had occurred.

The comparison of Examples 3 and 4 reveals that chain scission is the predominate reaction when a high proportion of polymer is exposed to oxygen. This is independent of the presence of antioxidant. That is, even when antioxidant is present, polyketone which is irradiated in the substantial presence of oxygen underwent chain scission. Crosslinking predominated over chain scission in Example 4 demonstrating that limiting the exposure of the volume of the material to oxygen results in curing as opposed to degradation. In this example, polyketone polymer having a large specific surface area was irradiated but oxygen was not present. Crosslinking predominated showing that shielding the bulk of the volume of the polymer from oxygen, whether or not an antioxidant is used, is important to the process of this invention.

Example 5

The polyketone polymer as set forth in Example 1 was processed through a tubular blown film line using a 1.25 inch Brabender extruder and prepared as a film having a thickness of 2 mil. Four 4×4 inch specimens were prepared from the blown film. The first specimen was not irradiated. It was analyzed to determined to have a Mw of 79,400. Three samples were then placed in an Energy Science Incorporated CB 150 Electrocurtain apparatus. The sample chamber was purged with nitrogen such that oxygen content was less than 100 ppm. Specimens were then exposed to electron beam irradiation having a voltage of 165 KV. Cathode power was 360 W. The specimen exposed to a total of 5 Mrads was found to have a Mw of 87,500, the specimen exposed to 10 Mrads was found to have a Mw of 141,000, and the specimen exposed to 20 Mrads was found to have a Mw of 144,000 (with 20% gels).

This example shows that e-beam irradiation of polyketone polymer in the substantial absence of oxygen results in the curing of the polymer.

Example 6

Three different ⅛ inch type I tensile bars were prepared from the polyketone polymer of Example 1. Tensile bar A was not irradiated or treated to a further melt heat history. Tensile bar B was subjected to 5.6 Mrad of γ-radiation. Tensile bar C was placed in a ⅛ inch mold and heated for 20 minutes at 265 C. in a compression molder with a clamp pressure of 10,000 psi to induce crosslinking in the melt. Tensile bar C was then removed from the compression molder and cooled to room temperature.

The tensile bars were then submitted to visible fluorescence observations by exposing them to the light emitted from an unfiltered hand-held mercury vapor lamp. No visible fluorescence was observed in the case of Tensile bars A and B. A bright yellow fluorescence was observed in Tensile bar C, the melt crosslinked sample.

Further fluorescence specrotophotometric characterization was undertaken by studying the excitation and emission spectra of the solid materials at 23° C. with a Perkin-Elmer MPF-66 spectrophotometer. Tensile bars A and B showed only faint fluorescent emissions at 490 nm (relative intensity of 0.04) after excitation with light of 400 nm while Tensile bar C showed one broad, intense peak centered at 490 nm (relative intensity of 1.04).

This example illustrates that the cured polyketone according to this invention has different molecular structure from the melt crosslinked polyketone.

Example 7

Polyketone polymers prepared in accordance with Example 1 were injection molded into thrust washers for tribological testing. Specimen A was not subsequently exposed to radiation. Specimen B was irradiated with 5.6 Mrads of γ-radiation and Specimen C was irradiated with 20 Mrads of γ-radiation. Tribological properties were as follows:

Specimen A: LPV=32,000 psi, Wear Factor=464 $10^{-10}$ $in^3$-min/lb-ft-hr

Specimen B: LPV>200,000 psi (exceeds capacity of instrumentation), Wear Factor=150 $10^{-10}$ $in^3$-min/lb-ft-hr.

Specimen C: LPV>200,000 psi (exceeds capacity of instrumentation), Wear Factor=2135 $10^{-10}$ $in^3$-min/lb-ft-hr.

This example illustrates the significant improvement in tribological properties exhibited in polyketone polymers cured according to this invention. Typical additive blends of polyketones prepared expressly for tribological applications have been found to have LPVs of about 53,000–55,000 psi. Thus it can be seen that there is substantial improvement in tribological properties of polyketones subjected to the curing process of this invention. This improvement was not expected and makes articles produced according to this invention especially well suited for applications in which they are to be placed in rolling or sliding contact with another article. Gears, bearings, cams, followers, sprockets, washers, vessel liners, bushings, pulleys, sliding plates and many other like articles would benefit from the curing process.

What is claimed is:

1. An article of manufacture comprising a high energy radiation cured alternating aliphatic polyketone wherein said polyketone has a number average average molecular weight of at least about 20,000 and said cured polyketone does not exhibit a substantial increase in light emitted at 490 nm upon exposure to light of 400 nm relative to the polyketone polymer from which said article was cured.

2. The article of claim 1 exhibiting an LPV greater than about 55,000 psi.

3. The article of claim 2 exhibiting an LPV greater than about 200,000 psi.

4. The article of claim 1 exhibiting a Wear Factor less than 464 $10^{-10}$ $in^3$-min/lb-ft-hr.

5. The composition of claim 1 wherein said cured polyketone has a Mw at least 10% greater than the uncured polyketone from which it was produced.

6. A method of making an article of manufacture comprising injection molding said article from linear alternating polyketone polymer and then exposing said article to high energy radiation until said polyketone polymer cures.

7. The method of claim 6 wherein said article has a specific surface area of less than about $2.19 \times 10^{-3}$ $m^2$/gm.

8. The method of claim 7 wherein said article is to be placed in rolling or sliding contact with another article.

9. The method of claim 8 wherein said article is selected from the group consisting of gears, bearings, cams, washers, followers, sprockets, bushings, pulleys, vessel liners, and sliding plates.

10. The method of claim 7 conducted in air.

11. The method of claim 6 conducted in a substantially inert atmosphere.

12. The method of claim 11 wherein said atmosphere is created by blanketing said polyketone polymer in nitrogen or a noble gas.

13. The method of claim 7 wherein said radiation is γ-radiation.

14. The method of claim 13 comprising between about 1 and 50 mrads of γ-radiation.

15. The method of claim 13 comprising between about 5 and 20 mrads of γ-radiation.

16. The method of claim 7 wherein said radiation is electron beam radiation.

17. The method of claim 7 wherein said radiation is ion beam radiation.

18. A product made by the process of claim 7.

19. The product of claim 18 which does not exhibit an increase in visible fluorescence upon exposure to light from a mercury vapor lamp relative to the polyketone polymer from which said composition was made.

20. The product of claim 19 which does not exhibit a substantial increase in light emitted at 490 nm upon exposure to 400 nm relative to the polyketone polymer from which said composition was made.

21. A method of enhancing the tribological properties of an article comprising alternating aliphatic polyketone polymer comprising exposing said article to high energy radiation until said polyketone polymer cures.

22. The method of claim 21 wherein said article has a specific surface area of less than about $2.19 \times 10^{-3}$ $m^2$/gm.

23. The method of claim 21 wherein said article is selected from the group consisting of gears, bearings, cams, followers, sprockets, bushings, pulleys, and sliding plates.

24. The method of claim 21 wherein said radiation is γ-radiation.

25. The method of claim 24 comprising between about 1 and 50 mrads of γ-radiation.

26. The method of claim 25 comprising between about 5 and 20 mrads of γ-radiation.

27. The method of claim 21 wherein said radiation is electron beam radiation.

28. The method of claim 21 wherein said radiation is ion beam radiation.

* * * * *